United States Patent
Meng et al.

(10) Patent No.: US 12,412,947 B2
(45) Date of Patent: Sep. 9, 2025

(54) BATTERY MODULE

(71) Applicant: Huawei Digital Power Technologies Co., Ltd., Shenzhen (CN)

(72) Inventors: Hao Meng, Dongguan (CN); Kui Zhou, Dongguan (CN); Ruisheng Ma, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 835 days.

(21) Appl. No.: 17/702,968

(22) Filed: Mar. 24, 2022

(65) Prior Publication Data
US 2022/0311074 A1   Sep. 29, 2022

(30) Foreign Application Priority Data

Mar. 25, 2021   (CN) .......................... 202110322522.3

(51) Int. Cl.
| H01M 10/6563 | (2014.01) |
| H01M 10/613 | (2014.01) |
| H01M 10/617 | (2014.01) |
| H01M 10/647 | (2014.01) |
| H01M 10/6557 | (2014.01) |
| H01M 10/6561 | (2014.01) |

(52) U.S. Cl.
CPC ..... *H01M 10/6563* (2015.04); *H01M 10/613* (2015.04); *H01M 10/617* (2015.04); *H01M 10/647* (2015.04); *H01M 10/6557* (2015.04); *H01M 10/6561* (2015.04)

(58) Field of Classification Search
None
See application file for complete search history.

(56) References Cited

U.S. PATENT DOCUMENTS

| 2006/0091856 A1 | 5/2006 | Lee et al. |
| 2009/0111010 A1 | 4/2009 | Okada et al. |
| 2011/0104547 A1 | 5/2011 | Saito et al. |

(Continued)

FOREIGN PATENT DOCUMENTS

| CN | 203746929 U | 7/2014 |
| CN | 210778180 U | 6/2020 |
| CN | 210926220 U | 7/2020 |

(Continued)

OTHER PUBLICATIONS

Notice of Allowance issued in CN202110322522.3, dated Oct. 19, 2022, 4 pages.

(Continued)

*Primary Examiner* — Jonathan Crepeau

(57) ABSTRACT

Embodiments of this application provide a battery module, to improve consistency of cooling effects of battery cells, so that a battery cell group has a better states of health (SOH). The battery module includes: a heat dissipation mechanical part, which includes a first heat dissipation region and a second heat dissipation region. When an average distance between a heat dissipation pipe in the first heat dissipation region and a cooling medium outflow region is longer than an average distance between a heat dissipation pipe in the second heat dissipation region and the cooling medium outflow region, density of heat dissipation pipes in the first heat dissipation region is greater than density of heat dissipation pipes in the second heat dissipation region.

20 Claims, 6 Drawing Sheets

(56) References Cited

U.S. PATENT DOCUMENTS

2014/0116664 A1   5/2014   Landre
2015/0200429 A1   7/2015   Lee et al.

FOREIGN PATENT DOCUMENTS

| CN | 211480235 U | 9/2020 |
| CN | 112072043 A | 12/2020 |
| CN | 112086711 A | 12/2020 |
| CN | 212209703 U | 12/2020 |
| JP | 2020510965 A | 4/2020 |

OTHER PUBLICATIONS

Extended European Search Report issued in EP22164316.6, dated Sep. 13, 2022, 7 pages.

BATTERY MODULE

CROSS-REFERENCE TO RELATED APPLICATION

This application claims priority to Chinese Patent Application No. 202110322522.3, filed on Mar. 25, 2021, which is hereby incorporated by reference in its entirety.

TECHNICAL FIELD

Embodiments of this application relate to the energy field, and in particular, to a battery module.

BACKGROUND

A battery module generally includes a battery cell group, a busbar, and a battery management system (BMS) module. When states of health (SOH) of all battery cells in the battery cell group are relatively consistent, the entire battery module may have the best working performance, and may also have a longest life span in a relatively long time dimension. A heat dissipation system of the battery module needs to ensure that all the battery cells have as similar cooling effects as possible, so that the SOHs of all the battery cells are relatively consistent.

A heat dissipation system of the battery module includes parallel air ducts that are evenly distributed between battery cell layers. In other words, a primary air intake duct and an air exhaust duct are respectively located on two sides, that is, a positive electrode and a negative electrode of a battery cell. A plurality of secondary air intake ducts perpendicular to the primary air intake duct and the air exhaust duct are disposed between the primary air intake duct and the air exhaust duct, the plurality of secondary air intake ducts are parallel to each other, the secondary air intake ducts have a fixed interval, the primary air intake duct, the secondary air intake ducts, and the air exhaust duct are located in a same plane, and the plane is located in the middle of surfaces of two adjacent battery cells. After air outflows from the plurality of secondary air intake ducts are converged in the air exhaust duct, the air outflows through a fan.

However, because an amount of air in the battery module is relatively large near the fan, and is relatively small away from the fan, a relatively strong cooling effect is achieved on a battery cell near the fan, and a relatively poor cooling effect is achieved on a battery cell far away from the fan. Cooling effects of the battery cells are different, and therefore, SOHs of the battery cells are inconsistent due to different working temperatures. Consequently, optimal performance and a life span of the entire battery module are reduced.

SUMMARY

Embodiments of this application provide a battery module, so that consistency of cooling effects of battery cells can be improved, and a battery cell group has a better SOH.

A first aspect of embodiments of this application provides a battery module.

The battery module includes battery cells that are stacked in layers and a heat dissipation mechanical part. The heat dissipation mechanical part is located between a first battery cell layer and a second battery cell layer, and two surfaces of the heat dissipation mechanical part are respectively bonded to the first battery cell layer and the second battery cell layer.

The heat dissipation mechanical part includes a first heat dissipation region and a second heat dissipation region, and an average distance between a heat dissipation pipe in the first heat dissipation region and a cooling medium outflow region is longer than an average distance between a heat dissipation pipe in the second heat dissipation region and the cooling medium outflow region.

Density of heat dissipation pipes in the first heat dissipation region is greater than density of heat dissipation pipes in the second heat dissipation region.

It may be understood that density of heat dissipation pipes in a heat dissipation region that is relatively far away from the cooling medium outflow region is greater than an area of a heat dissipation pipe in a heat dissipation region that is relatively close to the cooling medium outflow region. Therefore, a relatively strong cooling effect caused by heat dissipation pipes in relatively high density is brought to a heat dissipation region that is relatively far away from a cooling medium transport device in the cooling medium outflow region and therefore has a relatively poor cooling effect, and similar cooling effects are brought to heat dissipation regions at different distances from the cooling medium outflow region. In this way, consistency of cooling effects of battery cells is improved, so that the battery cell group has a better SOH.

Based on the first aspect, this embodiment further provides a first implementation of the first aspect:

A first heat dissipation region that is relatively far away from the cooling medium outflow region includes a primary heat dissipation pipe and a secondary heat dissipation pipe.

The primary heat dissipation pipe is connected to a primary cooling medium input region on a housing of the battery module, and the secondary heat dissipation pipe is connected to a secondary cooling medium input region.

It may be understood that the secondary cooling medium input region is disposed on the housing of the battery module, and the secondary cooling medium input region is connected to the secondary heat dissipation pipe, so that a cooling medium inflow amount of the first heat dissipation region that is relatively far away from the cooling medium outflow region can be increased, and a cooling effect is improved.

Based on the first aspect to the second implementation of the first aspect, this embodiment of provides a third implementation of the first aspect:

In the heat dissipation mechanical part, primary heat dissipation pipes are parallel to each other, and secondary heat dissipation pipes are parallel to each other. The primary heat dissipation pipe and the secondary heat dissipation pipe are located in a same plane, and the secondary heat dissipation pipe and the primary heat dissipation pipe are perpendicular to each other.

It may be understood that the primary heat dissipation pipe and the secondary heat dissipation pipe are perpendicular to each other. A cooling medium entering the primary heat dissipation pipe is blocked by the secondary heat dissipation pipe perpendicular to the primary heat dissipation pipe, and does not enter the secondary heat dissipation pipe. All cooling mediums in the secondary heat dissipation pipe are from a secondary cooling medium inflow region, so that the cooling medium inflow amount of the first heat dissipation region is increased.

Based on the first aspect to the third implementation of the first aspect, this embodiment provides a fourth implementation of the first aspect:

The battery module further includes a battery cell group fastener, the battery cell group fastener is located between the housing and a surface battery cell layer, the battery cell group fastener includes two primary fastening strips, a plurality of pairs of holes are disposed on the two primary fastening strips, the plurality of pairs of holes are used to circulate the cooling medium, and a connection line of the plurality of pairs of holes is parallel to the primary heat dissipation pipe in the heat dissipation mechanical part.

It may be understood that, after the hole is disposed on the primary fastening strip on the battery cell group fastener, the cooling medium may be circulated, and a heat dissipation function is performed, so that the heat dissipation mechanical part is prevented from being disposed on the surface battery cell layer, and space is saved.

Based on the first aspect to the fourth implementation of the first aspect, this embodiment provides a fifth implementation of the first aspect:

The battery module further includes an insulated cover plate. The insulated cover plate is located between the housing of the battery module and a positive-electrode surface of the battery cell group or is located between the housing of the battery module and a negative-electrode surface of the battery cell group, the insulated cover plate includes an intermediate region and two end regions, and density of holes disposed in the intermediate region is greater than density of holes disposed in the two end regions.

It may be understood that, after the hole is disposed on the insulated cover plate, the cooling medium may be circulated, and a heat dissipation function is performed. Therefore, a cooling medium circulating pipe is prevented from being disposed between the positive-electrode surface of the battery cell group and the housing of the battery module and between the negative-electrode surface of the battery cell group and the housing of the battery module, and space is saved.

Based on the first aspect to the fifth implementation of the first aspect, this embodiment provides a sixth implementation of the first aspect:

The heat dissipation mechanical part is a plastic member.

Based on the first aspect to the sixth implementation of the first aspect, this embodiment provides a seventh implementation of the first aspect:

The battery cell group fastener is a sheet metal.

As can be learned from the foregoing technical solutions, embodiments of this application have the following advantages. The heat dissipation mechanical part is located between the first battery cell layer and the second battery cell layer, the two surfaces of the heat dissipation mechanical part are respectively bonded to the first battery cell layer and the second battery cell layer, the heat dissipation mechanical part includes the first heat dissipation region and the second heat dissipation region, and the density of the heat dissipation pipes in the heat dissipation region that is relatively far away from the cooling medium outflow region is greater than the density of the heat dissipation pipes in the heat dissipation region that is relatively close to the cooling medium outflow region. The density of the heat dissipation pipes in the heat dissipation region that is relatively far away from the cooling medium outflow region is greater than the area of the heat dissipation pipe in the heat dissipation region that is relatively close to the cooling medium outflow region. Therefore, a relatively strong cooling effect caused by heat dissipation pipes in relatively high density is brought to a heat dissipation region that is relatively far away from a cooling medium transport device in the cooling medium outflow region and therefore has a relatively poor cooling effect, and similar cooling effects are brought to heat dissipation regions at different distances from the cooling medium outflow region. In this way, consistency of cooling effects of battery cells is improved, so that the battery cell group has a better SOH.

DESCRIPTION OF EMBODIMENTS

Embodiments of this application provide a battery module, to improve consistency of cooling effects of battery cells, so that a battery cell group has a better SOH.

With the development of new energy sources, increasingly more electric energy is used, and as an apparatus that can reasonably use the electric energy, a battery is used increasingly more widely. In particular, a rechargeable battery represented by a lithium-ion battery is widely used in the field of energy storage and power.

In actual application, to achieve an ideal use effect, the battery is used together with an electronic control unit to form a battery module for application. The battery module includes a chemical apparatus, a battery cell, an electronic control device, a busbar, a BMS control board, and the like. However, heat is generated in a process of using the chemical apparatus, the battery cell, and the electronic control apparatus. If the heat cannot be discharged in a timely manner, temperature in the battery module increases, and in this case, the battery cell and the electronic control apparatus are adversely affected in a high-temperature environment. Consequently, problems in terms of safety, stability, and a life span are caused.

In the battery module, a life span of a battery cell group greatly differs due to a running environment. When each single battery cell in the battery cell group runs in a case in which environment is relatively consistent, not only peak performance of the battery cell group can be performed at present, but a relatively long life span can also be obtained in a long term.

However, in a current industrial application, to reduce the weight and volume of the battery module and reduce costs, the battery module mainly uses a cooling medium outflow region, and several cooling medium transport devices are disposed in the cooling medium outflow region. Consequently, battery cells in the battery cell group obtain different cooling medium circulation amounts and different cooling effects due to different distances from the cooling transport device. This greatly reduces consistency of the battery cell group, affects an SOH of the battery cell group, reduces performance of the battery cell group, and shortens a life span of the battery cell group. Therefore, a new heat dissipation structure of the battery cell group is urgently needed to improve the SOH of the battery cell group.

Figure 1A:
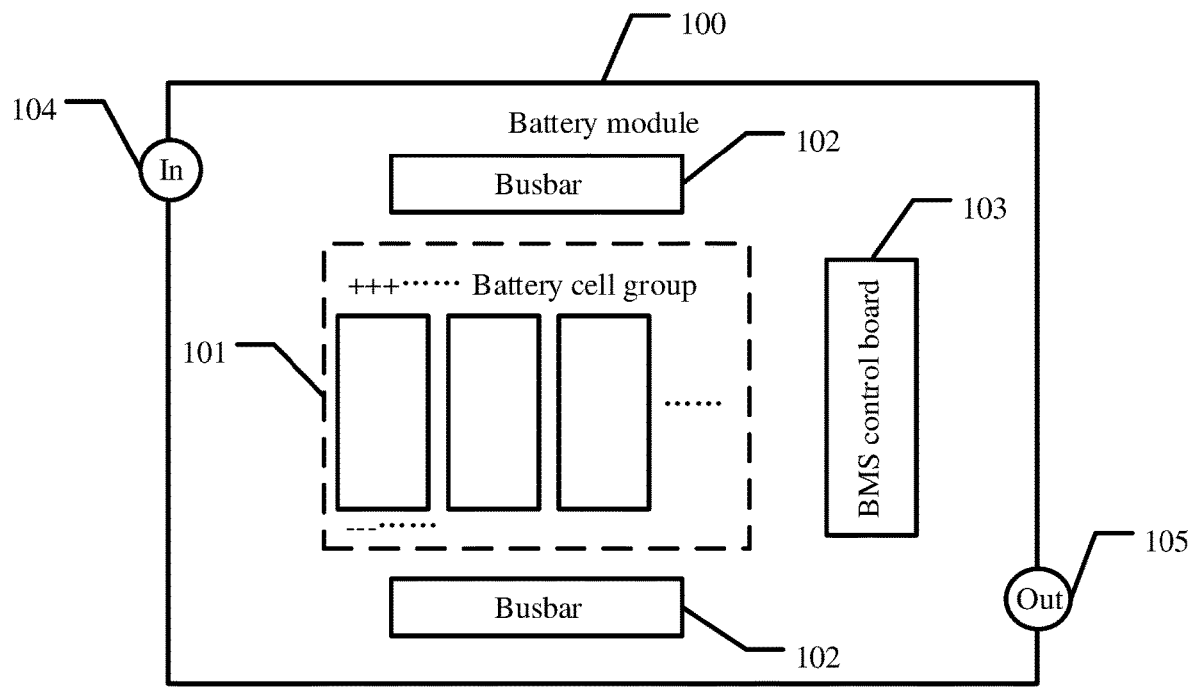
FIG. 1(A) and FIG. 1(B) are a schematic diagram of a heat dissipation scenario of a battery module according to an embodiment of this application.
Figure 1B:
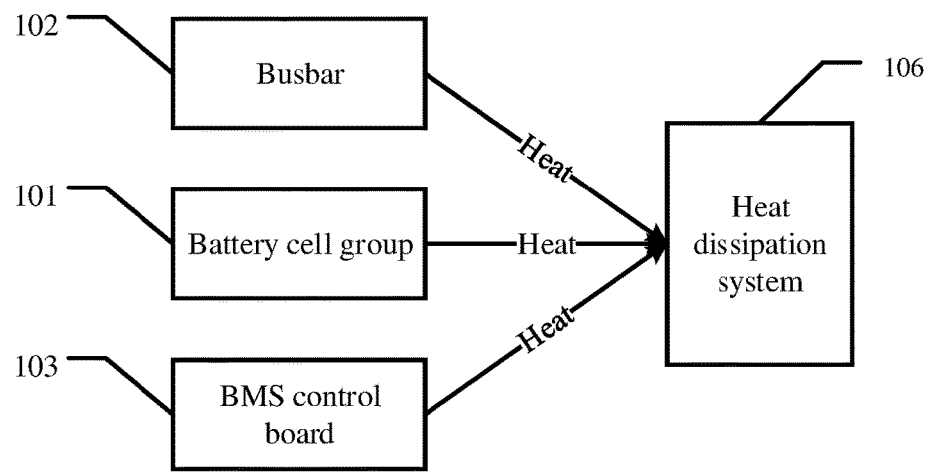

A heat dissipation scenario of a battery module in an embodiment of this application is described below. Referring to FIG. 1(A) and FIG. 1(B):

This embodiment may be applied to a battery module shown in FIG. 1(A).

A battery module 100 includes a battery cell group 101, a busbar 102, and a BMS control board 103.

The battery cell group 101 is configured to convert chemical energy into electric energy, and heat is generated in a process of generating the electric energy.

The busbar 102 is located on a positive-electrode side and a negative-electrode side of the battery cell group 101, converges the electric energy generated by the battery cell group 101 into a current, and is connected to a power-consuming apparatus or device outside the battery module 100.

The BMS control board 103 is configured to control a working status of each battery cell in the battery cell group 101. When a battery cell is faulty, the BMS control board disconnects the faulty battery cell, to prevent the faulty battery cell from affecting running of the entire battery cell group 101.

A cooling medium inflow region 104 is a region in which a housing of the battery module communicates with the outside, and is generally obtained by disposing a hole on the housing of the battery module. A cooling medium flows into the battery module 100 from the cooling medium inflow region 104.

A cooling medium outflow region 105 is a region in which the housing of the battery module communicates with the outside. Generally, a cooling medium transport device is disposed in the cooling medium outflow region 105, to discharge the cooling medium in the battery module 100 to the outside.

It should be noted that, in this embodiment, the cooling medium may be air, or may be another cooling medium, such as inert gas or insulated liquid. This is not specifically limited herein.

It should be noted that in this embodiment, a heat dissipation structure of the battery module described below is described merely by using an example in which the cooling medium is air, the cooling medium transport device is a fan, the cooling medium inflow region is an air intake vent, and the cooling medium outflow region is an air exhaust vent.

In this embodiment, a heat dissipation scenario of the battery module is shown in FIG. 1(B).

The battery cell group 101 generates heat, and the busbar 102 and the BMS control board 103 generate heat based on a current heat effect. The heat generated by the busbar 102 and the BMS control board 103 is discharged out of the battery module by using the cooling medium inflow region 104 of a heat dissipation system 106, to avoid a case in which working environments of the battery cell group 101, the busbar 102, and the BMS control board 103 are affected because temperature increases due to the heat. In addition, dynamic change paces in a heat dissipation process further need to be adjusted to be consistent, to ensure consistency of the battery cell group 101.

Based on the heat dissipation scenario of the battery module shown in FIG. 1(A) and FIG. 1(B), a structure of a heat dissipation mechanical part in an embodiment of this application is described below.

Figure 2:
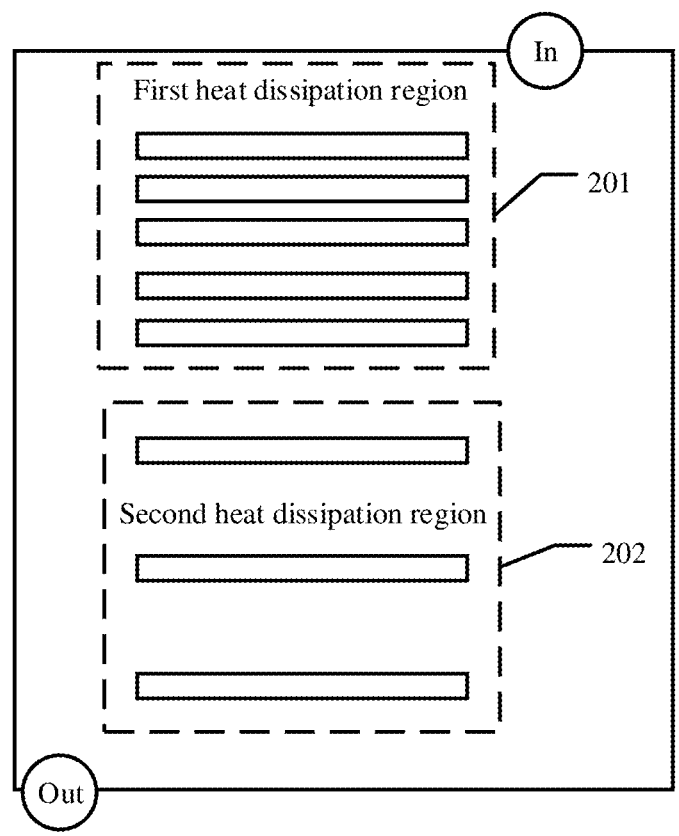
FIG. 2 is a schematic diagram of a structure of a heat dissipation mechanical part according to an embodiment of this application.

A structure of the heat dissipation mechanical part in this embodiment is shown in FIG. 2.

The heat dissipation mechanical part shown in FIG. 2 includes a plurality of heat dissipation pipes that are parallel to each other and are located in a same plane, and the entire heat dissipation mechanical part is divided into a first heat dissipation region 201 and a second heat dissipation region 202.

The first heat dissipation region 201 is relatively far away from an air exhaust vent, the second heat dissipation region 202 is relatively close to the air exhaust vent, and density of heat dissipation channels in the first heat dissipation region 201 is greater than density of heat dissipation channels in the second heat dissipation region 202.

Figure 3:
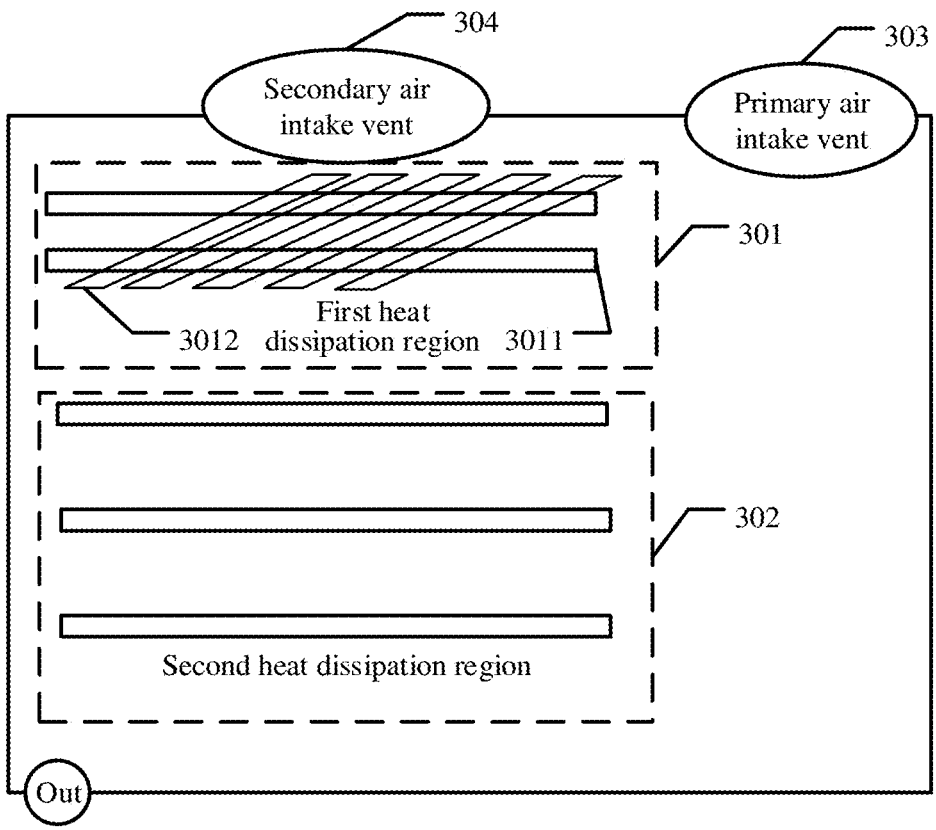
FIG. 3 is a schematic diagram of another structure of a heat dissipation mechanical part according to an embodiment of this application.

Another structure of the heat dissipation mechanical part in this embodiment is shown in FIG. 3.

The heat dissipation mechanical part shown in FIG. 3 includes a first heat dissipation region 301, a second heat dissipation region 302, a primary air intake vent 303, and a secondary air intake vent 304.

Density of ventilation pipes in the first heat dissipation region 301 is greater than that in the second heat dissipation region 302.

The first heat dissipation region 301 includes a primary heat dissipation pipe 3011 and a secondary heat dissipation pipe 3012. The primary heat dissipation pipe 3011 is in a same direction as a heat dissipation pipe in the second heat dissipation region 302, and the primary heat dissipation pipe 3011 and the heat dissipation pipe in the second heat dissipation region 302 are parallel to each other. The secondary heat dissipation pipe 3012 and the primary heat dissipation pipe 3011 are in different directions, the secondary heat dissipation pipe 3012 is connected to the secondary air intake vent 304, and the primary heat dissipation pipe 3011 and the heat dissipation pipe in the second heat dissipation region 302 are connected to the primary air intake vent 303.

The secondary heat dissipation pipe 3012 and the primary heat dissipation pipe 3011 are connected to each other. Air may enter the primary heat dissipation pipe 3011 from the primary air intake vent 303, and then flow out from the air exhaust vent. Air flows into the secondary heat dissipation pipe 3012 from the secondary air intake vent 304, and then is converged to a primary heat dissipation pipe 3011, and then flows out from the air exhaust vent.

Figure 4:
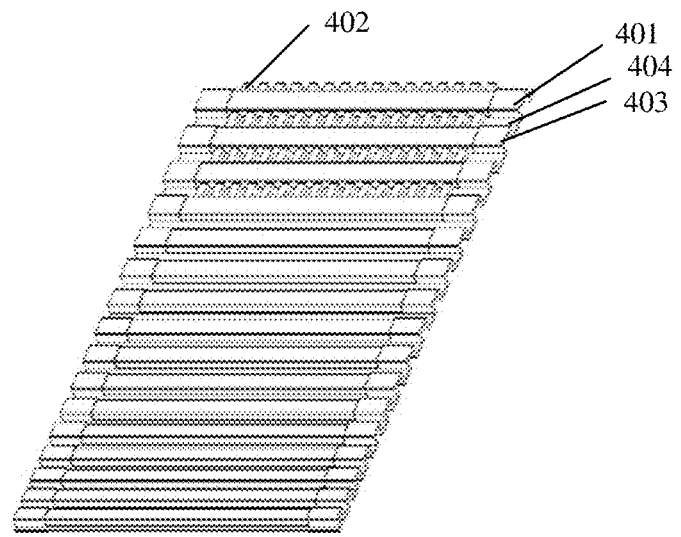
FIG. 4 is a schematic diagram of another structure of a heat dissipation mechanical part according to an embodiment of this application.

Another structure of the heat dissipation mechanical part in this embodiment is shown in FIG. 4.

The heat dissipation mechanical part shown in FIG. 4 includes a primary heat dissipation pipe 401 and a secondary heat dissipation pipe 402. The primary heat dissipation pipe 401 and the secondary heat dissipation pipe 402 are connected to each other, the primary heat dissipation pipe 401 and the secondary heat dissipation pipe 402 are perpendicular to each other, the secondary heat dissipation pipe 402 is connected to a secondary air intake vent, and the primary heat dissipation pipe 401 is connected to a primary air intake vent.

It may be understood that, because the secondary heat dissipation pipe 402 and the primary heat dissipation pipe 401 cross and are perpendicular to each other, all cold air flowing into the secondary heat dissipation pipe 402 is from the secondary air intake vent, and no cold air from the primary air intake vent directly enters the secondary heat dissipation pipe 402. In this way, offloading of the cold air from the primary air intake vent can be reduced, supply from the secondary air intake vent can be increased, and an overall air intake volume can be improved.

Figure 5:
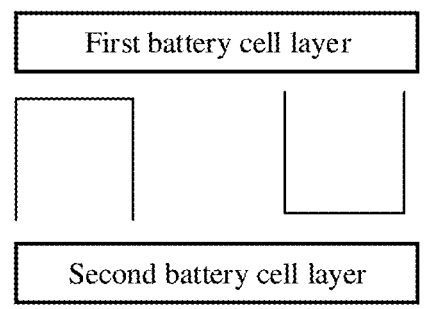
FIG. 5 is a schematic diagram of a structure of a heat dissipation pipe according to an embodiment of this application.

An opening direction of the primary heat dissipation pipe 401 and an opening direction of a primary heat dissipation pipe 403 are the same, and the primary heat dissipation pipe 403 and a primary heat dissipation pipe 404 are adjacent and have opposite opening directions. The opening direction is a cooling direction, and an open surface is closely bonded to a to-be-cooled destination battery cell layer. A scenario of the heat dissipation mechanical part is shown in FIG. 5.

The heat dissipation mechanical part is located between a first battery cell layer and a second battery cell layer. When an opening direction of a heat dissipation mechanical part on the left is upward, an objective is to cool the first battery cell layer. When the opening direction is downward, an objective is to cool the second battery cell layer. The opening direction may be set based on a requirement. In this embodiment, only an example in which opening directions of adjacent primary heat dissipation pipes are opposite to each other and an opening direction of the secondary heat dissipation pipe is downward is used for description.

Figure 6:
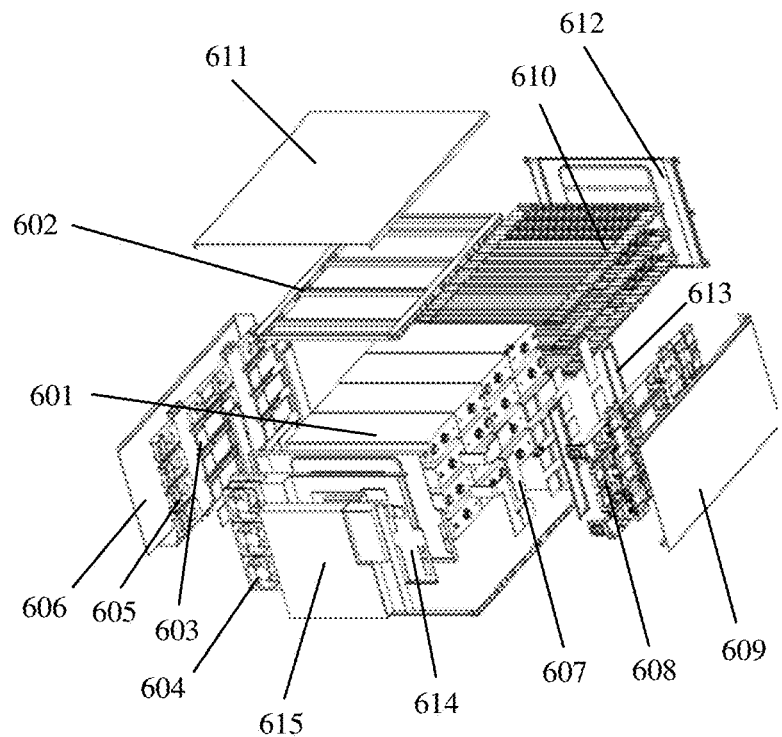
FIG. 6 is a schematic diagram of assembly of a battery module according to an embodiment of this application.

With reference to the foregoing description, an embodiment of this application provides a battery module. Referring to FIG. 6, the battery module shown in FIG. 6 includes a battery cell 601, a fastener 602, a left busbar 603, a module fan 604, a left insulated cover plate 605, a left panel 606, a right busbar 607, a right insulated cover plate 608, a right panel 609, a heat dissipation mechanical part 610, an upper cover plate 611, an air intake plate 612, a fixed sheet metal 613, a BMS control board 614, and a front panel 615.

A structure of the heat dissipation mechanical part 610 is shown in the embodiments shown in FIG. 2 to FIG. 5.

Figure 7:
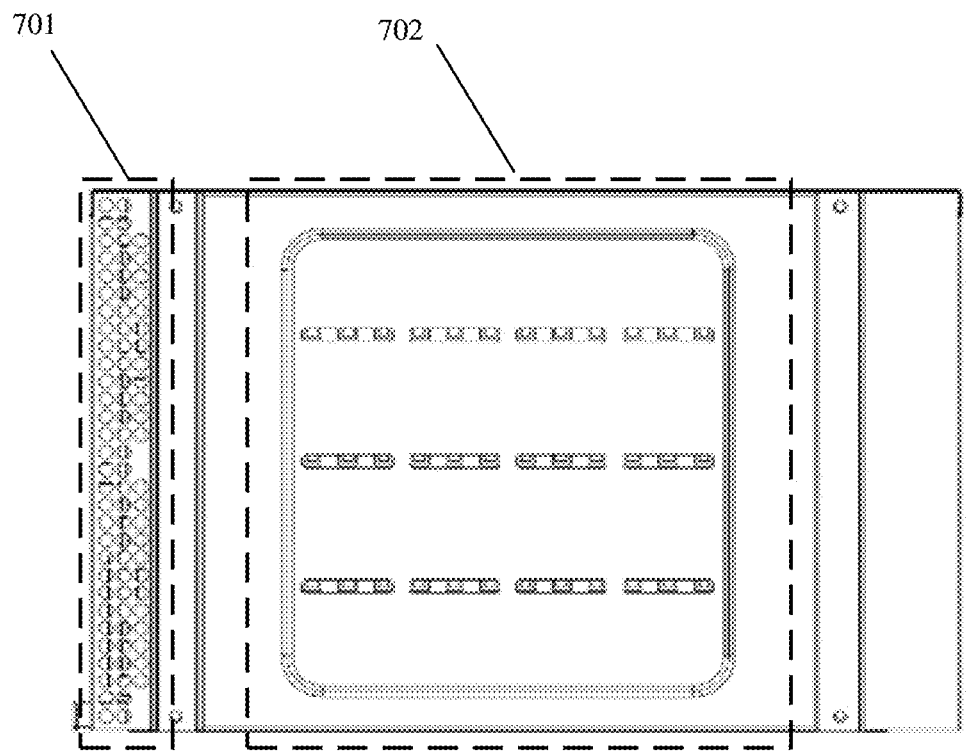
FIG. 7 is a schematic diagram of a structure of an air intake plate according to an embodiment of this application.

A structure of the air intake plate 612 is shown in FIG. 7.

The air intake plate shown in FIG. 7 includes a primary air intake vent 701 and a secondary air intake vent 702.

The secondary air intake vent 702 is connected to a secondary heat dissipation channel in the heat dissipation mechanical part 610, and the primary air intake vent 701 flows into a ventilation cavity formed by using the right busbar 607, the right insulated cover plate 608, and the right panel 609. A structure of the right insulated cover plate 608 is shown in FIG. 8.

Figure 8:
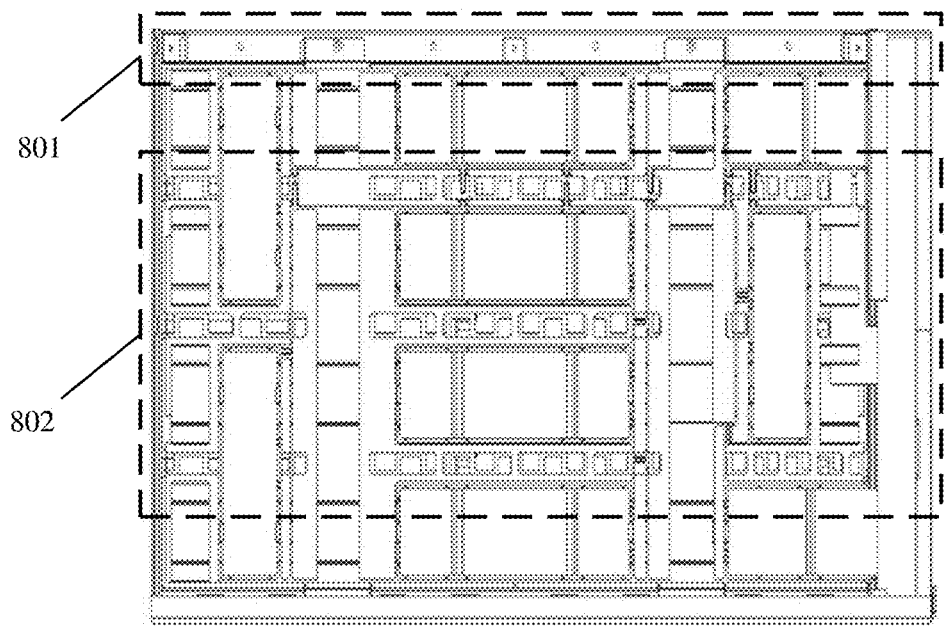
FIG. 8 is a schematic diagram of a structure of an insulated cover plate according to an embodiment of this application.

The right insulated cover plate 608 shown in FIG. 8 includes an edge region 801 and an intermediate region 802. Density of holes included in the intermediate region 802 is higher, and density of holes included in the edge region 801 is lower.

A structure of a convergence cavity formed by using the left panel 606, the left insulated cover plate 605, and the left busbar 603 in FIG. 6 is similar to a structure of the ventilation cavity. Details are not described herein again.

A structure of a BMS cavity formed by using the BMS control board 614 and the front panel 615 in FIG. 6 is similar to the structure of the ventilation cavity and the structure of the convergence cavity. Details are not described herein again.

There are parallel holes on the fastener 602. A structure of the fastener 602 is shown in FIG. 9.

Figure 9:
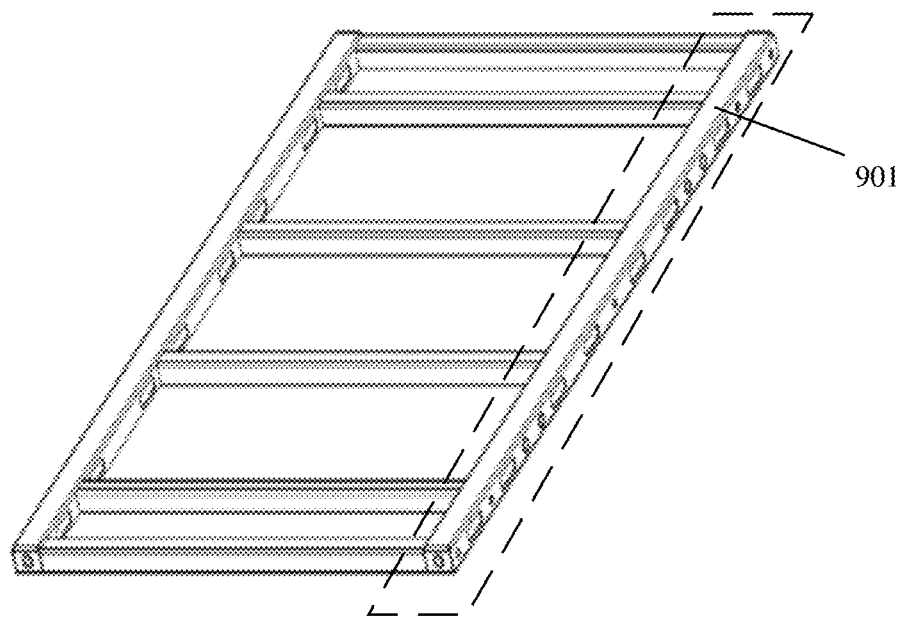
FIG. 9 is a schematic diagram of a structure of a fastener according to an embodiment of this application.

The fastener 602 shown in FIG. 9 includes a primary fastening strip 901, and the primary fastening strip 901 includes a plurality of parallel hole pairs. In a process of fastening the battery cell, cold air may flow through the hole.

Figure 10:
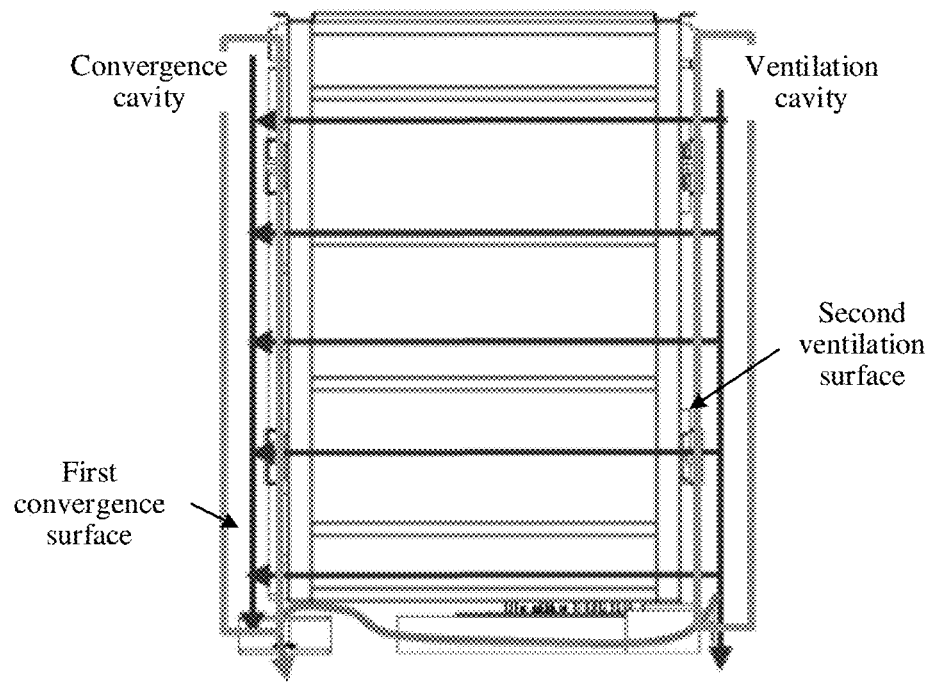
FIG. 10 is a schematic diagram of a cooling scenario of a battery module according to an embodiment of this application.

FIG. 10 shows directions of air in the ventilation cavity and the convergence cavity.

There is a ventilation gap between the busbar and a side panel in the ventilation cavity and the convergence cavity formed between the insulated cover plate and the side panel, so that the busbar is cooled. A hole is disposed on a side that is of the ventilation cavity and that is opposite to a primary air intake vent surface. Some air can flow into a BMS cavity formed by using a front panel 1 and a front panel 2. After the BMS cavity is cooled, the air flows into an air intake surface of a fan through a side face.

What is claimed is:

1. A battery module, comprising a heat dissipation mechanical part, wherein
the heat dissipation mechanical part is located between a first battery cell layer and a second battery cell layer, two surfaces of the heat dissipation mechanical part are respectively bonded to the first battery cell layer and the second battery cell layer, and the first battery cell layer and the second battery cell layer are two adjacent battery cell layers in a battery cell group;
the heat dissipation mechanical part comprises a first heat dissipation region and a second heat dissipation region;
the first heat dissipation region comprises M heat dissipation pipes, and an average distance between the M heat dissipation pipes and a cooling medium outflow region located on a housing is a first distance, wherein M is a positive integer greater than or equal to 1;
the second heat dissipation region comprises N heat dissipation pipes, and an average distance between the N heat dissipation pipes and the cooling medium outflow region located on the housing is a second distance, wherein N is a positive integer greater than or equal to 1; and
the first distance is greater than the second distance, and a ratio of M to an area of the first heat dissipation region is greater than a ratio of N to an area of the second heat dissipation region,
wherein a density of heat dissipation pipes in the first heat dissipation region is greater than a density of heat dissipation pipes in the second heat dissipation region.

2. The battery module according to claim 1, wherein
the M heat dissipation pipes comprise W primary heat dissipation pipes and T secondary heat dissipation pipes, wherein a sum of W and T is M, W is a positive integer greater than or equal to 1, and T is a positive integer greater than or equal to 1; and
the W primary heat dissipation pipes are connected to a primary cooling medium input region, the T secondary heat dissipation pipes are connected to a secondary cooling medium input region, and the primary cooling medium input region and the secondary cooling medium input region are located in different areas on the housing.

3. The battery module according to claim 2, wherein
the W primary heat dissipation pipes are parallel to each other, the T secondary heat dissipation pipes are parallel to each other, and the W primary heat dissipation pipes and the T secondary heat dissipation pipes are located on a same plane.

4. The battery module according to claim 2, wherein
the T secondary heat dissipation pipes and the W primary heat dissipation pipes are perpendicular to each other.

5. The battery module according to claim 1, comprising a battery cell group fastener located between the housing and a third battery cell layer, wherein the third battery cell layer is an uppermost battery cell layer or a lowermost battery cell layer in the battery cell group, and the battery cell group fastener is attached to a surface of the third battery cell layer.

6. The battery module according to claim 5, wherein the M heat dissipation pipes comprise W primary heat dissipation pipes and T secondary heat dissipation pipes, a sum of W and T is M, W is a positive integer greater than or equal to 1, and T is a positive integer greater than or equal to 1; and
wherein the battery cell group fastener comprises two primary fastening strips, C pairs of holes are disposed on the two primary fastening strips, a connection line of each pair of the C pairs of holes is parallel to the W primary heat dissipation pipes, and C is a positive integer greater than or equal to 1.

7. The battery module according to claim 6, further comprising an insulated cover plate, wherein
the insulated cover plate is located 1) between the housing and a positive-electrode surface of the battery cell group or 2) between the housing and a negative-electrode surface of the battery cell group, and the insulated cover plate comprises an intermediate region and two end regions, wherein the intermediate region comprises D holes, the two end regions comprise E holes, and a ratio of an area of the D holes to an area of the intermediate region is greater than a ratio of an area of the E holes to an area of the two end regions.

8. The battery module according to claim 7, wherein the heat dissipation mechanical part is a plastic member.

9. The battery module according to claim 8, wherein the battery cell group fastener is a sheet metal.

10. The battery module according to claim 5, further comprising an insulated cover plate located between the housing of the battery module and a negative-electrode surface of the battery cell group.

11. A battery module, comprising
a first battery cell layer and a second battery cell layer;
a heat dissipation mechanical part, located between the first battery cell layer and the second battery cell layer, two surfaces of the heat dissipation mechanical part are respectively bonded to the first battery cell layer and the second battery cell layer, and the first battery cell layer and the second battery cell layer are two adjacent battery cell layers in a battery cell group;
the heat dissipation mechanical part comprising a first heat dissipation region and a second heat dissipation region;
the first heat dissipation region comprising M heat dissipation pipes, and an average distance between the M heat dissipation pipes and a cooling medium outflow region located on a housing is a first distance, wherein M is a positive integer greater than or equal to 1;
the second heat dissipation region comprising N heat dissipation pipes, and an average distance between the N heat dissipation pipes and the cooling medium outflow region located on the housing is a second distance, wherein N is a positive integer greater than or equal to 1; and
the first distance is greater than the second distance, and a ratio of M to an area of the first heat dissipation region is greater than a ratio of N to an area of the second heat dissipation region,
wherein a density of heat dissipation pipes in the first heat dissipation region is greater than a density of heat dissipation pipes in the second heat dissipation region.

12. The battery module according to claim 11, wherein
the M heat dissipation pipes comprise W primary heat dissipation pipes and T secondary heat dissipation pipes, wherein a sum of W and T is M, W is a positive integer greater than or equal to 1, and T is a positive integer greater than or equal to 1; and
the W primary heat dissipation pipes are connected to a primary cooling medium input region, the T secondary heat dissipation pipes are connected to a secondary cooling medium input region, and the primary cooling medium input region and the secondary cooling medium input region are located in different areas on the housing.

13. The battery module according to claim 12, wherein
the W primary heat dissipation pipes are parallel to each other, the T secondary heat dissipation pipes are parallel to each other, and the W primary heat dissipation pipes and the T secondary heat dissipation pipes are located on a same plane.

14. The battery module according to claim 12, wherein
the T secondary heat dissipation pipes and the W primary heat dissipation pipes are perpendicular to each other.

15. The battery module according to claim 11, further comprising a battery cell group fastener located between the housing and a third battery cell layer, wherein the third battery cell layer is an uppermost battery cell layer or a lowermost battery cell layer in the battery cell group, and the battery cell group fastener is attached to a surface of the third battery cell layer.

16. The battery module according to claim 15, wherein the M heat dissipation pipes comprise W primary heat dissipation pipes and T secondary heat dissipation pipes, a sum of W and T is M, W is a positive integer greater than or equal to 1, and T is a positive integer greater than or equal to 1; and
wherein the battery cell group fastener comprises two primary fastening strips, C pairs of holes are disposed on the two primary fastening strips, a connection line of each pair of the C pairs of holes is parallel to the W primary heat dissipation pipes, and C is a positive integer greater than or equal to 1.

17. The battery module according to claim 16, further comprising an insulated cover plate located 1) between the housing and a positive-electrode surface of the battery cell group or 2) between the housing and a negative-electrode surface of the battery cell group, wherein the insulated cover plate comprises an intermediate region and two end regions, the intermediate region comprises D holes, the two end regions comprise E holes, and a ratio of an area of the D holes to an area of the intermediate region is greater than a ratio of an area of the E holes to an area of the two end regions.

18. The battery module according to claim 17, wherein the heat dissipation mechanical part is a plastic member.

19. The battery module according to claim 18, wherein the battery cell group fastener is a sheet metal.

20. The battery module according to claim 15, further comprising an insulated cover plate located between the housing of the battery module and a negative-electrode surface of the battery cell group.

* * * * *